Patented Sept. 2, 1947

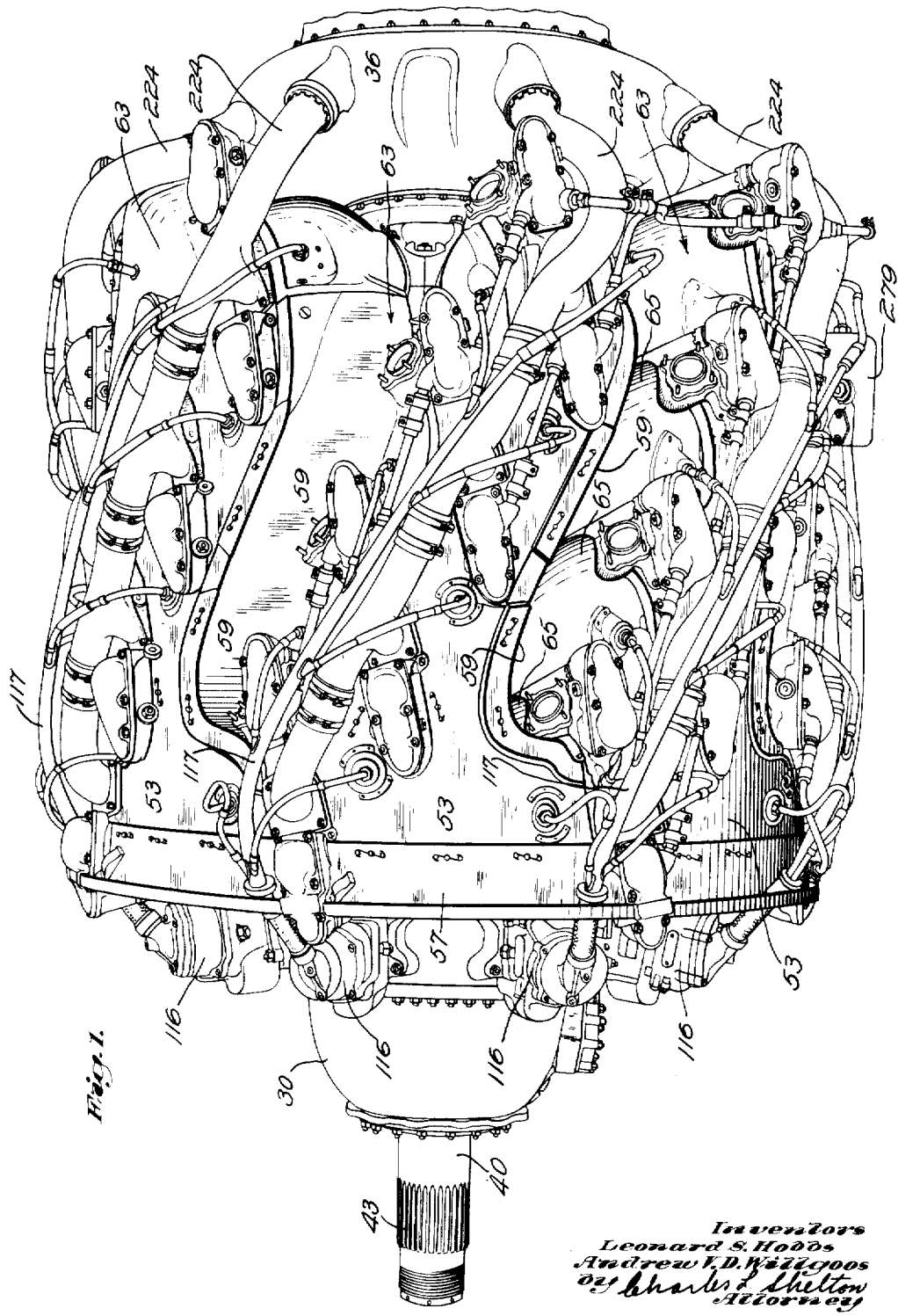

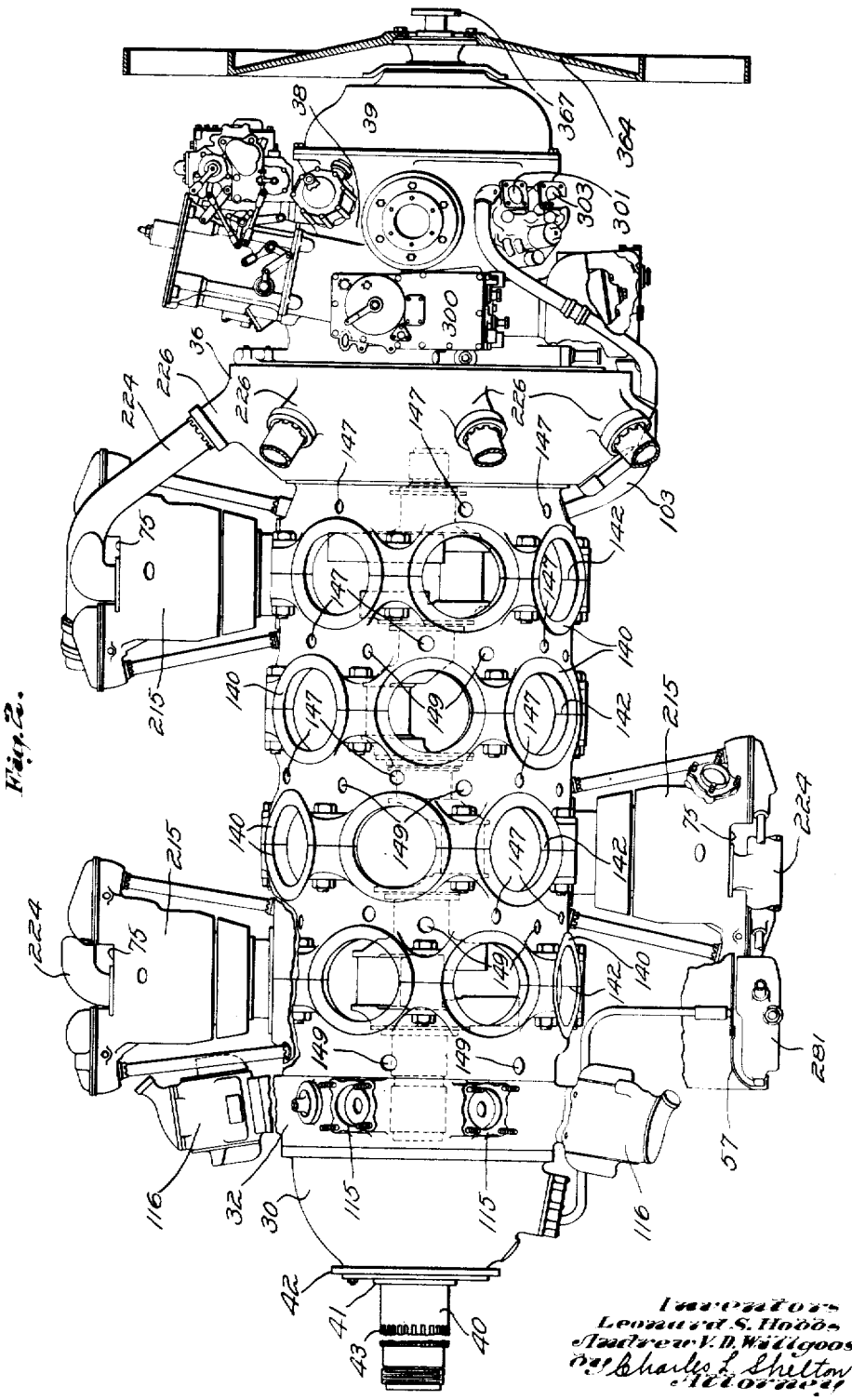

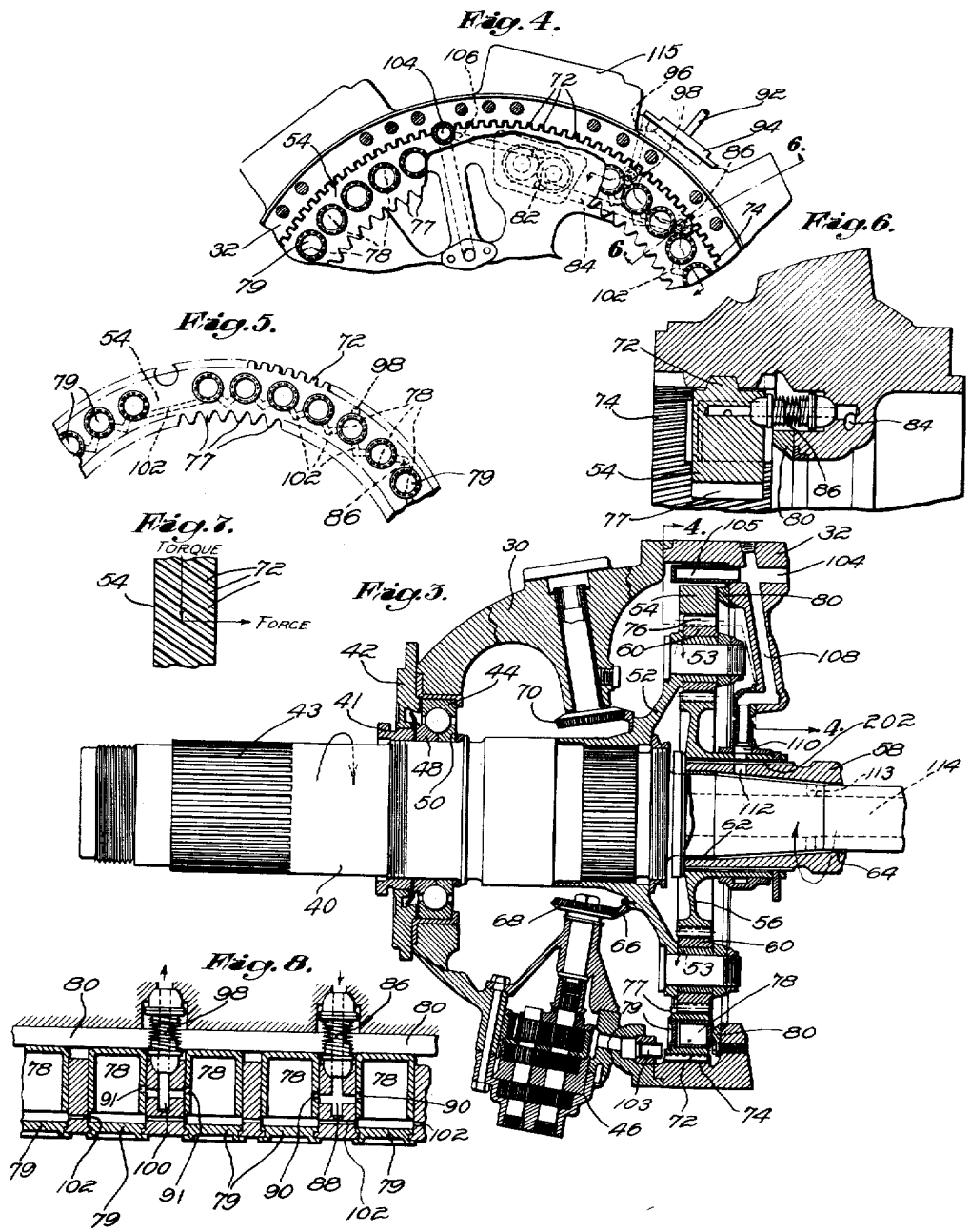

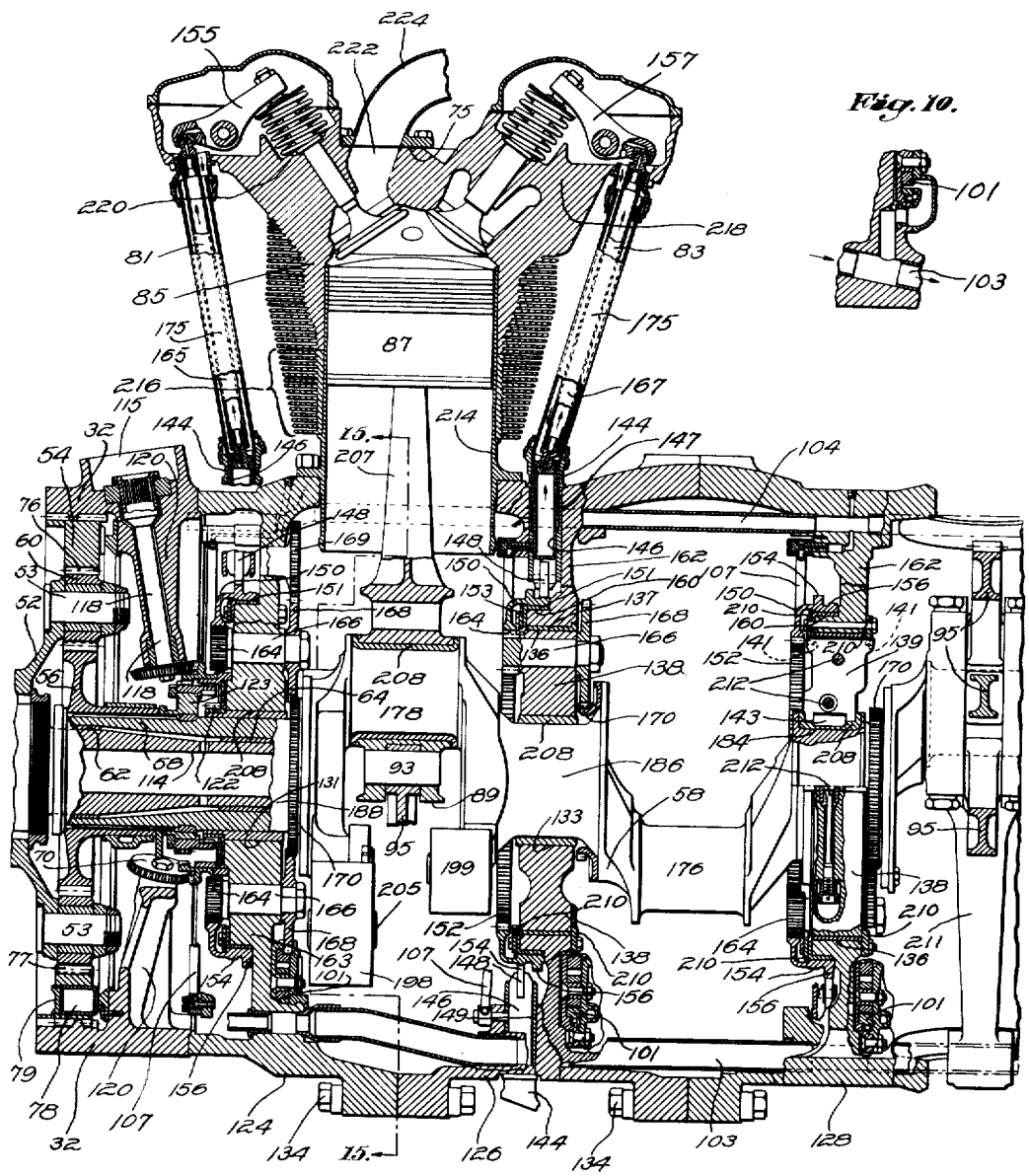

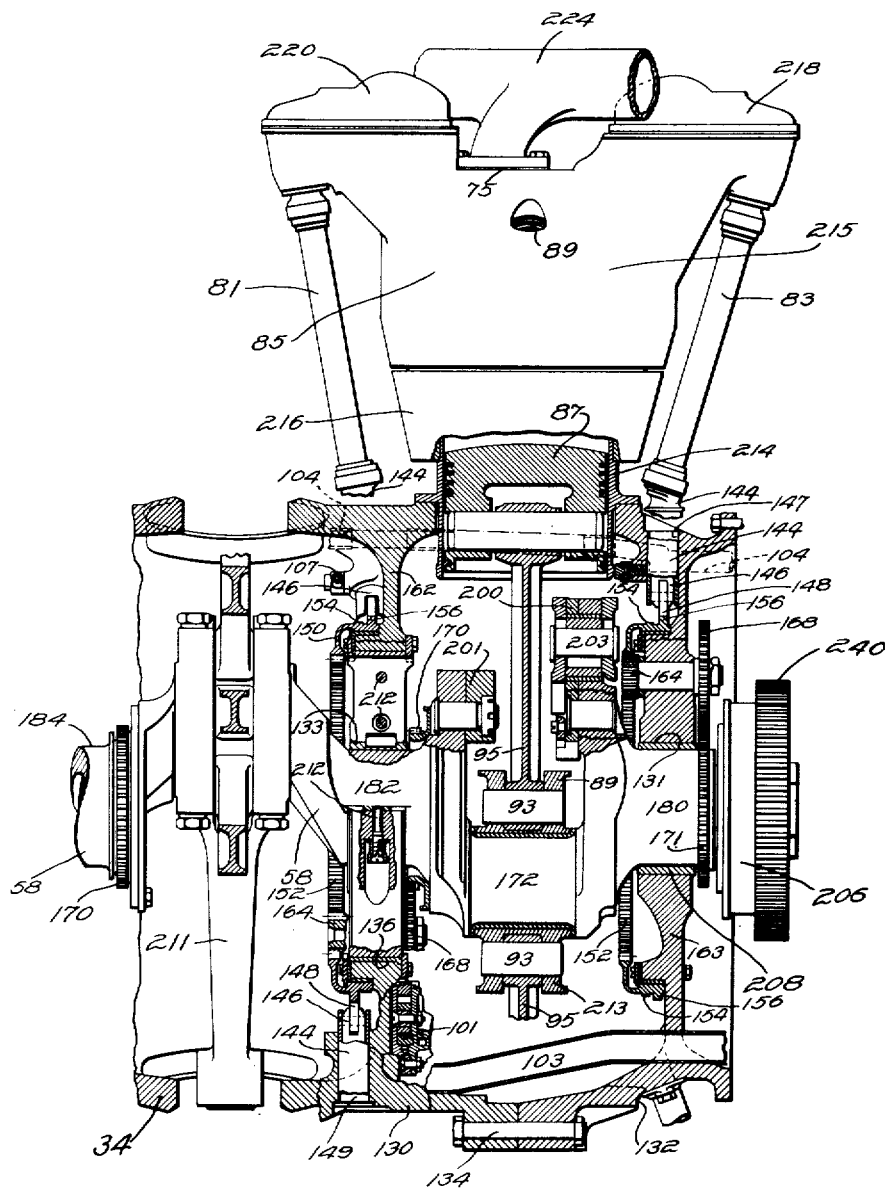

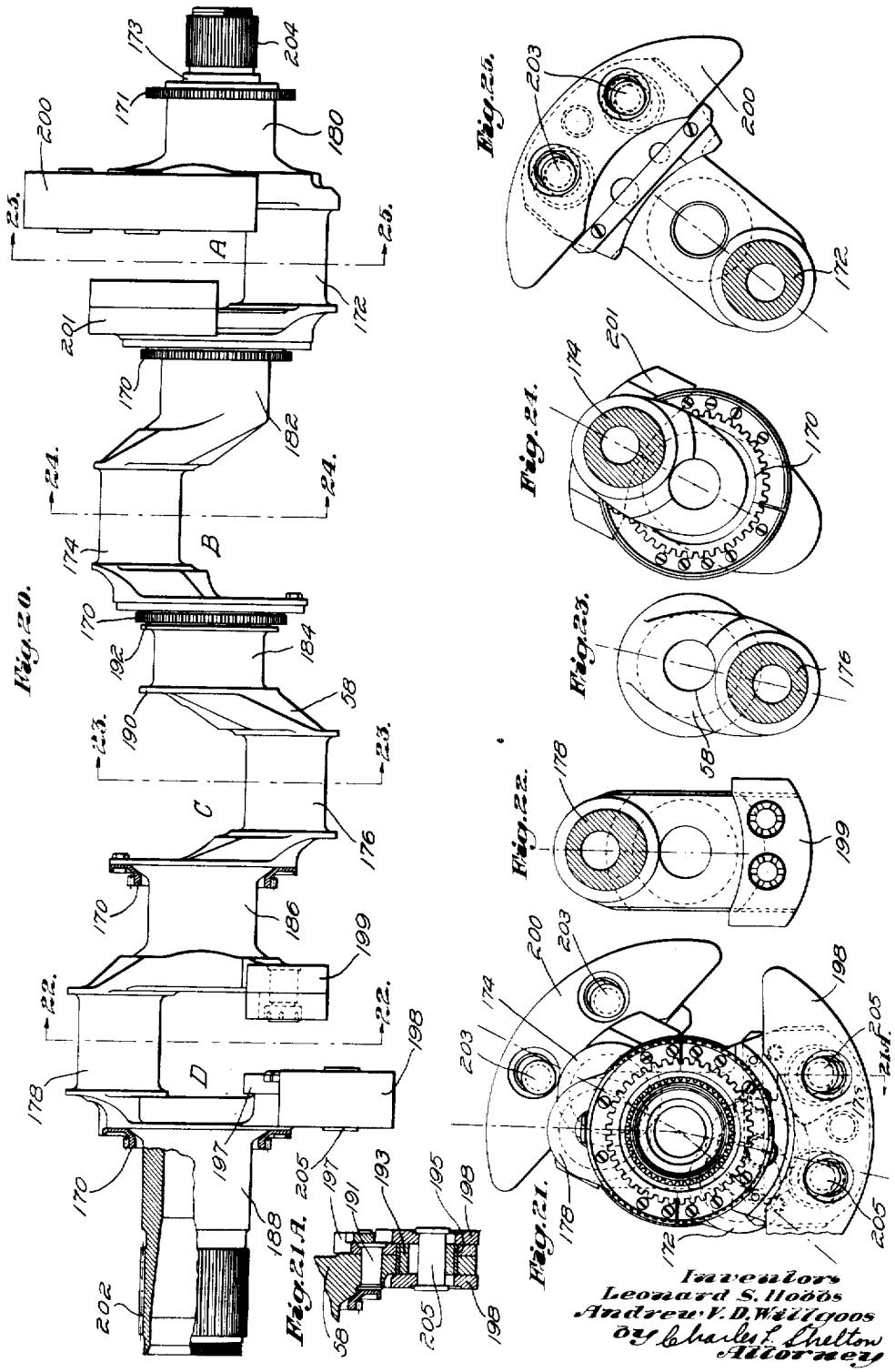

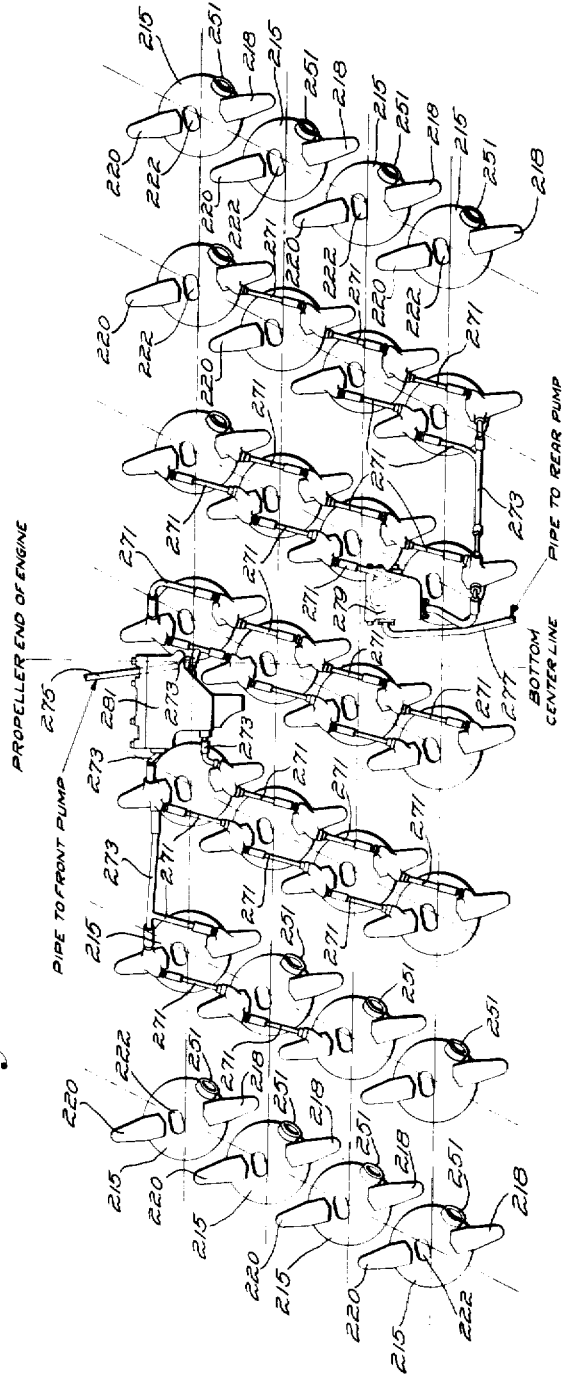

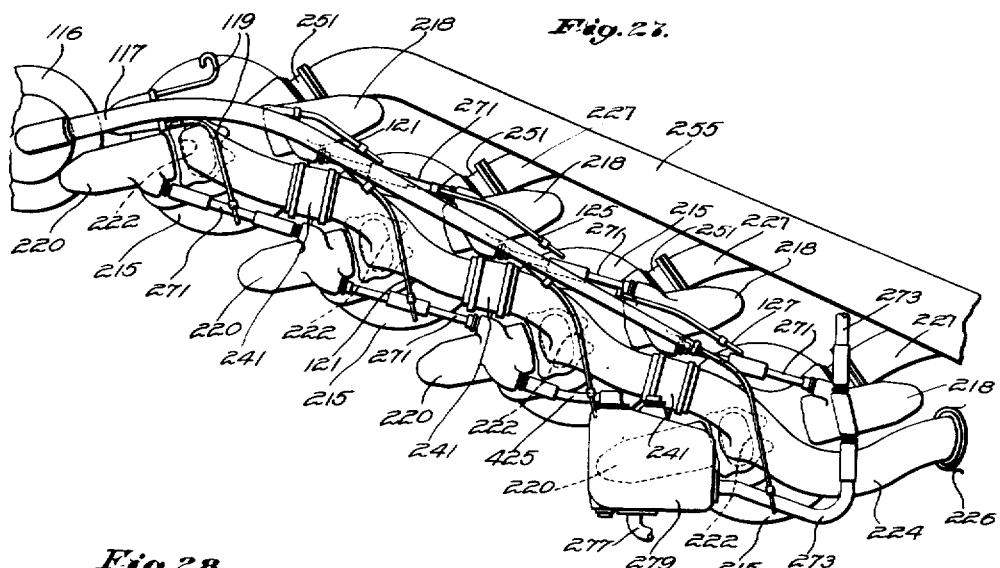
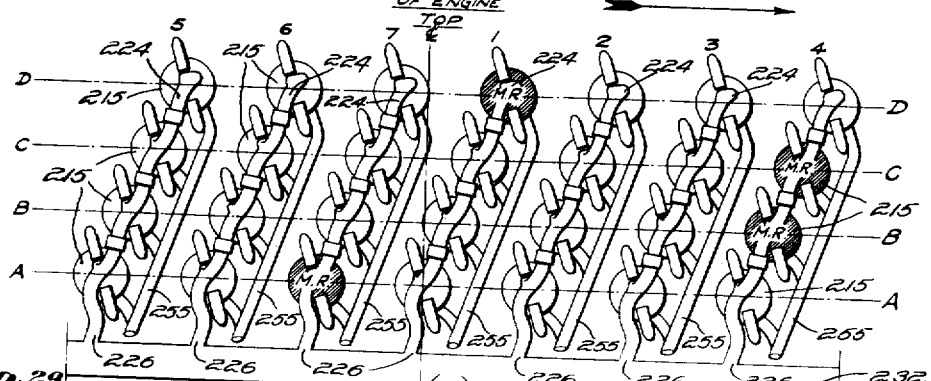
FIRING ORDER AND VALVE OVERLAP

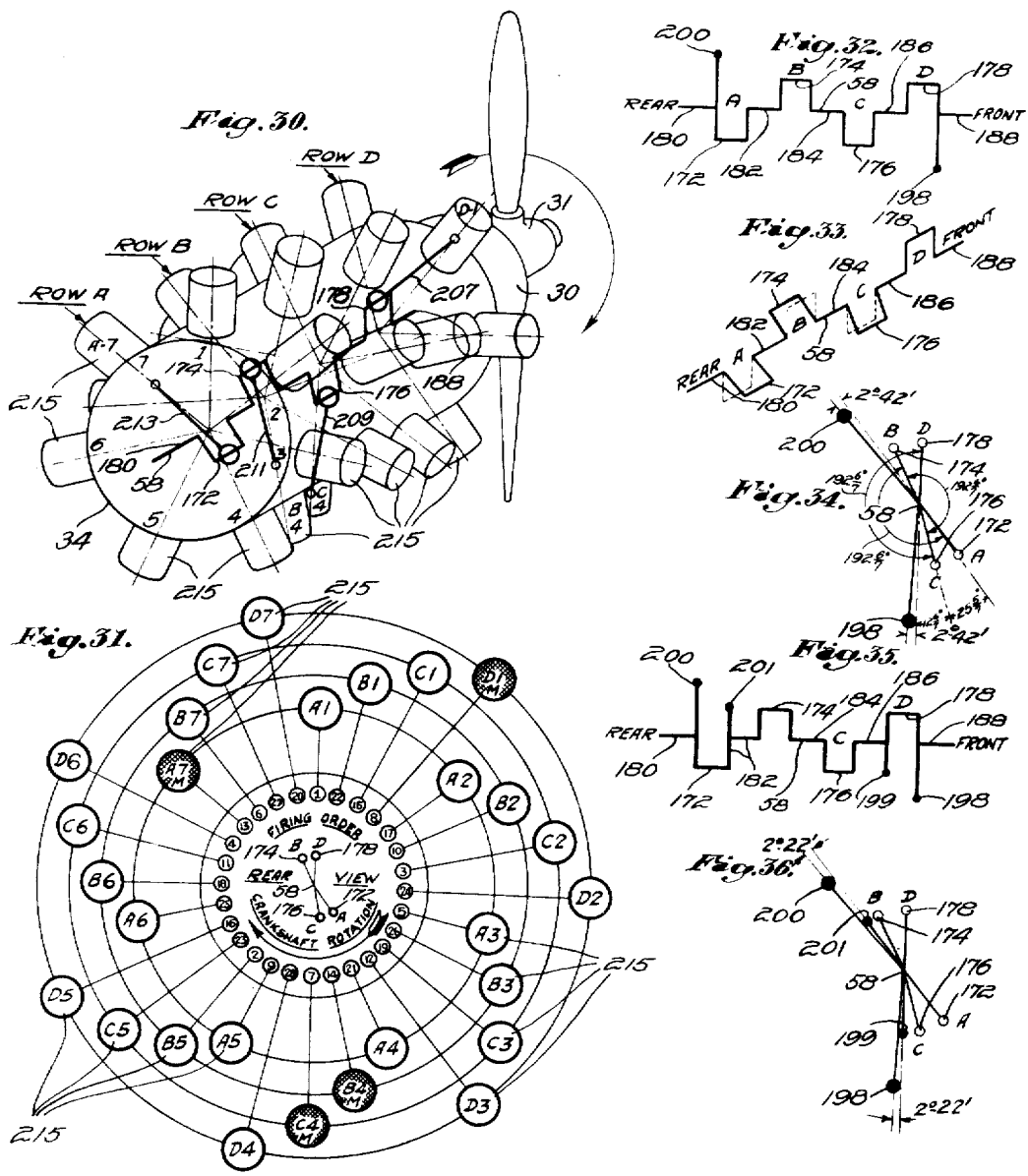

2,426,879

UNITED STATES PATENT OFFICE 2,426,879

RADIAL AIRCRAFT ENGINE

Leonard S. Hobbs and Andrew V. D. Willgoos, West Hartford, Conn., assignors to United Aircraft Corporation, East Hartford, Conn., a corporation of Delaware Application September 1, 1944, Serial No. 552,372

7 Claims. (Cl. 123—55)

This invention relates to multi-row radial aircooled aircraft engines.

An object of this invention is to provide a commercially practicable four row radial aircooled aircraft engine of high power output that is exceptionally dependable and efficient in operation.

Another object is to provide a novel and improved combination and arrangement of aircraft engine cylinders and charging and firing means therefor.

A further object of this invention is to provide a new combination and arrangement of engine parts which will enable the manufacture of a commercially practicable aircooled radial aircraft engine having four rows of seven cylinders in each row and which is compact both radially and longitudinally, is cooled uniformly and efficiently, is simple and lightweight in construction and reliable in operation and produces exceptionally high power with a minimum of vibration.

Other objects and advantages will be apparent from the specification and claims, and from the accompanying drawing which illustrates what is now considered to be a preferred embodiment of the invention.

In the drawing:

Fig. 1 is a side perspective view of the engine of this invention, including the inner cowling and omitting a portion of the rear section.

Fig. 2 is a side view of the engine, including the rear section and omitting some of the cylinders, magnetos, manifolds and other parts.

Figs. 3, 9, 11 and 12 are a series of views which together, in the order named, show a complete longitudinal section through the engine of Fig. 2. In these views, certain parts such as scavenge pumps and bearing supports have been broken away or rotated into the plane of the view in order to simplify the drawing.

Fig. 4 is a section, partly broken away, along the line 4—4 in Fig. 3.

Fig. 5 is an end view of the helically splined fixed gear and torquemeter pistons.

Fig. 6 is a section along the line 6—6 in Fig. 4.

Fig. 7 is a diagram showing the effect of the torque reaction on the fixed gear.

Fig. 8 is a developed view of the fixed gear and torquemeter pistons.

Fig. 10 is a partial section showing the connection between the scavenge pumps and the main scavenge oil line.

Fig. 20 is a side view of the crankshaft.

Fig. 21 is a front view of the crankshaft.

Fig. 21A is a sectional view along the line indicated by the arrows in Fig. 21.

Figs. 22, 23, 24 and 25 are transverse views along the correspondingly numbered lines in Fig. 20.

Fig. 26 is a developed view showing the rocker box oil drainage system.

Fig. 27 is a developed view of the number five cylinder bank, including the intake and exhaust manifolds, ignition mechanism, oil drainage pipes and rear oil sump.

Fig. 28 is a developed view showing diagrammatically the arrangement of the cylinders, supercharger, and intake and exhaust manifolds.

Fig. 29 is a chart showing the cylinder firing order and intake valve timing.

Fig. 30 is a schematic isometric view of the crankcase, nose section, and cylinders.

Fig. 31 is a diagram showing the relationship of the cylinder spacing to the crankpin spacing, and the firing order.

Figs. 32 to 36 are schematic views of the crankshaft, showing two modifications of the counterweighting.

Figure 12:
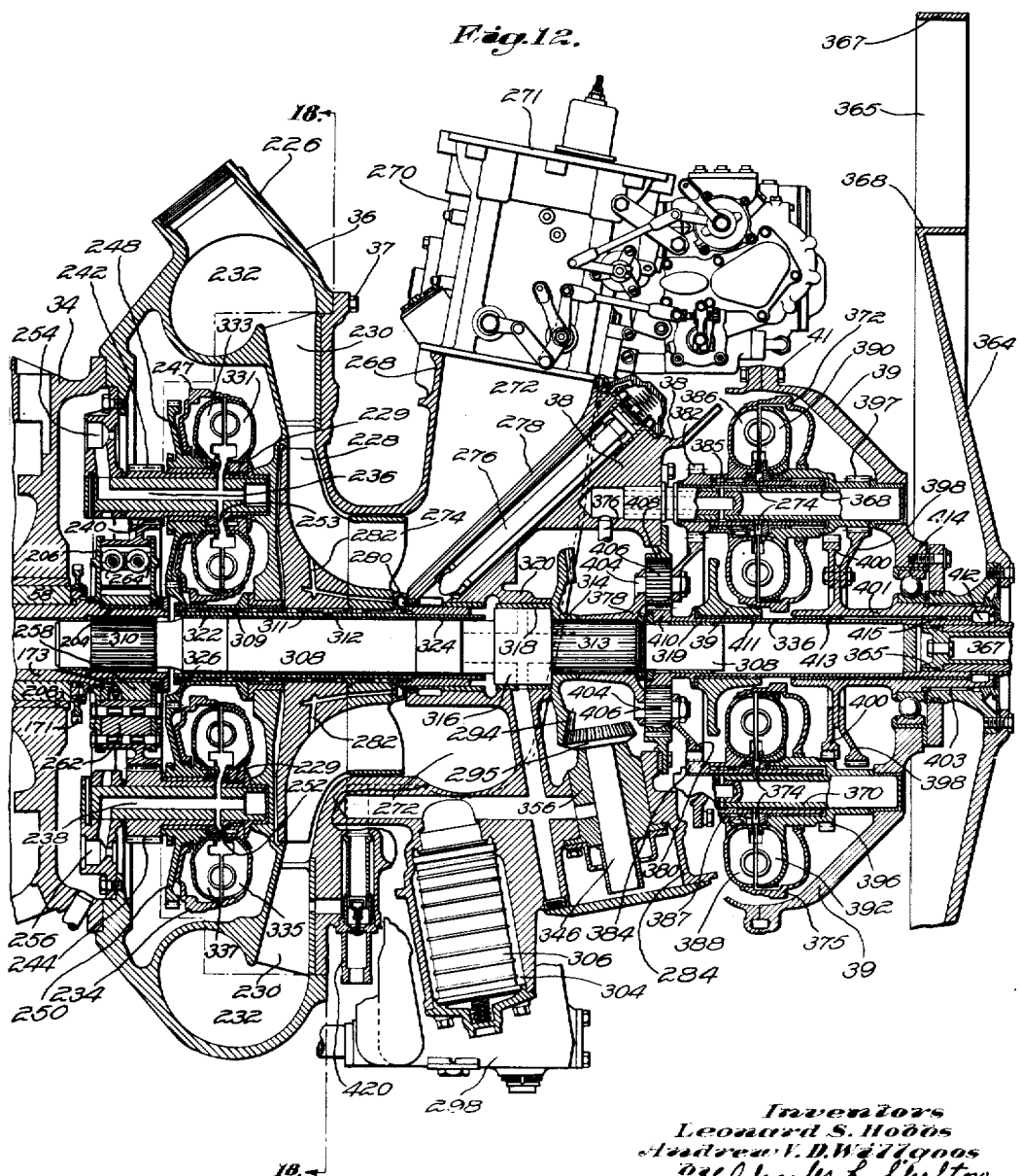

Radial aircooled engines are among the foremost commercial aircraft engines of the world.

The demand for higher powers has been met in such engines to a degree by increasing the number of cylinders in each row or by using two rows of cylinders, as well as by increasing the power output per cylinder. It has been proposed to further increase the power per airplane by increasing the number of engines provided, either with separate propellers for each engine as is currently the practice or by mechanically connecting two or more separate engines to a single shaft. Such expedients have material disadvantages, but until this invention the production of a commercially practicable radial aircooled engine of more than two rows and of high power output involved insuperable difficulties, for instance in cooling, charge distribution, vibration, size (both radially and longitudinally), weight, and simplicity of construction and maintenance or repair.

According to this invention, these problems have been solved, and other advantages obtained, by a novel combination and arrangement of engine cylinders, manifolds, valve mechanism, ignition mechanism and other parts and accessories providing a commercially practicable four row radial aircooled engine having a single crankshaft, which combines in one engine some of the advantages of both the in-line and radial types of engines, which is readily maintained and repaired, and which provides for the assembly of a large number of different engine types from a minimum number of engine parts or sub-assemblies.

Referring to the drawing, Fig. 1 illustrates an aircooled engine having twenty-eight cylinders arranged in four radial rows of seven cylinders each. The rows are located about the crankcase in such a way as to form a right-hand helix consisting of seven banks with four cylinders in each bank. The cylinder numbering and firing order are illustrated in Figs. 30 and 31. The top cylinder is A1 and the bottom cylinder is C4. For the purpose of this description the propeller end of the engine is designated the front and the anti-propeller end of the engine is designated the rear, though it is to be understood that this designation is for the purpose of explanation only and that the engine may be, with very little alteration, changed from the pusher to the tractor type or vice versa, as explained herein. The normal direction of rotation of the crankshaft and propeller shaft is clockwise as viewed from the rear and the sides of the engine are designated right and left as viewed from the rear or anti-propeller end when the engine is in a horizontal flight position.

As best shown in Fig. 2, the engine comprises a propeller shaft housing section 30, a magneto drive housing section 32, a crankcase or power section 34, a blower section 36, an accessory drive housing section 38, and an auxiliary drive housing section 39.

The propeller shaft housing 30 (Fig. 3) is a magnesium alloy casting which supports the propeller shaft 40 by a ball thrust bearing 44. Bearing 44 has a split inner race 48, 50 enabling removal of the ball and cage assembly for engine assembly purposes. Its inner race is secured to the shaft 40 by a nut 41 while the outer race is fixed to the housing 30 by a plate 42, bolted thereto. Front oil pump 46 is also mounted on the housing 30. Propeller shaft 40 is provided with splines 43 to receive a propeller, schematically indicated at 31 in Fig. 30.

The propeller shaft is driven by the cage 52 of a reduction gear drive comprising a fixed gear 54 and a sun gear 56. The sun gear is splined to the crankshaft 58 at 202 and drives the pinions 60 rotatably mounted on shafts 53 supported on cage 52. Propeller shaft 40 is supported at its rear end by the front end of the crankshaft, on bearings 62 and 64. Cage 52 has a bevel gear 66 thereon which drives pump pinion 68 and propeller governor drive pinion 70.

In order to measure engine torque, reduction drive fixed gear 54 is provided with splines 72 (Fig. 5) which engage similar splines 74 in the magneto drive housing 32. These splines are cut at an angle to the axis of the fixed gear so that engine driving torque exerted on the fixed gear produces a component thrust (Fig. 7) toward the rear of the fixed gear. Inner teeth 77 on the fixed gear, which engage the pinion teeth 76, are cut straight and enable slight movement of the fixed gear due to the component thrust illustrated in Fig. 7. To counteract this thrust there are forty small pistons 78 placed in holes in the rear face of the gear 54. The other ends of these holes are sealed by closures 79. The heads of pistons 78 abut against a steel ring 80 bolted to housing 32. Engine lubricating oil, whose pressure is raised by a booster pump 82 (Fig. 4), is fed to two of the pistons 78 by a passage 84, a telescoping connection 86, and drilled passages 88 in the fixed gear. These two pistons have small holes or valve ports 90 in their sides to control the oil flow in such a way that as the fixed gear moves rearward the oil flow to the pistons is increased and as the fixed gear moves forward the oil flow to the pistons is decreased. Thus the fixed gear is balanced between the thrust component of the engine torque and the thrust due to oil pressure between the pistons and their cylinders. The piston oil pressure is, therefore, directly proportional to the engine driving torque. A pressure gauge is attached to line 92 leading from the pressure transmitter 94, which is connected by passage 96, flexible connection 98, and passages 100 to valve ports or holes 91 in the sides of two others of the pistons 78, for reading the oil pressure therein. The remaining pistons are interconnected by drilled passages 102 so that the pressures in all of the forty pistons will be equalized and the thrust will be uniformly distributed around the periphery of the fixed gear 54. Torquemeter pump 82 is fed from the main pressure oil line 104 by a passage 106. Passage 104 is also connected by a transfer pipe 108 to an annular groove 110 which feeds oil through openings 112, 113 to the passage 114 to the front end of the crankshaft, and to the space between the bearings 62, 64.

Magneto housing 32 supports seven dual magnetos 116 on mounting pads 115 which are respectively positioned in front of each cylinder bank as shown in Figs. 1 and 2. Within the housing (Fig. 9) are seven radial magneto drive shafts 118 supported in webs 120. These shafts are driven by the crankshaft through an arrangement comprising an eccentric 123 splined to the crankshaft and a train of gears as disclosed and claimed in the King application Serial No. 534,896 (Patent No. 2,390,886). The magnetos are simultaneously timed by adjusting fixed gear 122 rotatably mounted on an extension of the front main bearing 208, which may be done in the manner disclosed and claimed in the Highberg application Serial No. 469,929 (Patent No. 2,390,881).

The main crankcase consists of five integral machined aluminum alloy forgings 124, 126, 128, 130 and 132, which are secured together on transverse parting lines with bolts 134. The three intermediate sections have large bores 136 which are fitted with steel liners 137.

Magnesium alloy crankshaft bearing supports or disks 138 fit removably within the liners 137 in the intermediate crankcase partitions 162. The two end crankcase sections have integral partitions 163 extending the full distance inwardly to the front and rear main bearings 208.

Twenty-eight cylinder mounting pads 140 are spaced around the outside of the five crankcase sections in four rows of seven pads (Figs. 1, 2, 30 and 31). The center line of each row is located at the parting face 142 between its two adjacent sections. Studs (not shown) are provided on the crankcase to hold each cylinder 216 in place on its mounting pad 140 so that the cylinder may be mounted in either of two opposed positions. Thus the cooling airflow may be maintained in the same direction of flow relative to the cylinders even though it be reversed in direction relative to the crankcase, so that either a pusher or tractor engine may be made from the same cylinder and crankcase parts, as disclosed and claimed in the Willgoos application Serial No. 444,033 (Patent No. 2,401,211).

The valve mechanism is of the overhead rocker box poppet valve type utilizing one intake and one exhaust valve in each cylinder and having intake and exhaust rocker arms 155, 157 and push rods 81, 83 actuated by fifty-six valve tappets 146 reciprocating in guides 144 symmetrically spaced around the outside of the five sections, in circular rows at the front and rear of each of the rows of cylinder mounting pads. Tappet guides 144 are of aluminum alloy shrunk into holes 147, 149 in the crankcase sections. There are four rows of holes 147 for the exhaust valve tappet guides and four rows of holes 149 for the intake valve tappet guides (Fig. 2); with two rows of interpositioned exhaust and intake tappet guide holes between each two adjacent cylinder rows. Tappets 146 reciprocate within their guides 144 in the conventional manner and are provided with rollers 148 which run on the intake cam tracks 154 and the exhaust cam tracks 156 on the cam rings 150.

The five cams 150 are identical, each having an internal annular gear 152 and external intake and exhaust tracks 154, 156 of three lobes each. Each cam is mounted on an aluminum alloy bearing ring 151 which fits onto a shelf 160 machined in the front wall of the partitions 162, 163 of the corresponding section of the crankcase. Each cam is driven in the opposite direction to crankshaft rotation at ⅛ crankshaft speed by the crankshaft through two cam reduction pinions 164 mounted on upper and lower pinion shafts 166 rotatably supported in the end partitions 163 and in the disks 138. Cam reduction gears 168 are splined to the rear of the pinion shafts on the opposite sides of the corresponding crankcase partitions. Each pair of upper and lower cam reduction gears 168 mesh with a separate cam drive gear 170, 171 mounted on the crankshaft 58. The front four cam drive gears 170 are split and bolted to the crank shaft to form a continuous gear while the rear cam drive gear 171 is of one-piece construction and is splined to the crankshaft.

Crankshaft 58 is supported within crankcase 34 by five steel backed sleeve bearings 208 having silver and specially processed lead on their inside surface. The center main bearing is flanged for locating the shaft axially and transmitting thrust to the crankcase. The front and rear bearings are of one-piece construction and are pressed and pinned into central bores 131 in the partitions 163 of the corresponding crankcase sections 124, 132. The front intermediate, center, and rear intermediate main bearings are split along their horizontal center line and are held securely within central bores 133, in the bearing support disks 138, which are each split to form two segments having flat keys 139 between their parting faces. These keys have projections fitting within slots 141 in segmental plates 210 bolted to opposite sides of the partitions 162, to prevent the disks from turning, and the bearings 208 are locked against rotation relative to the disks by the small keys 143, fitted between the disk halves. Plates 210 extend radially past the parting lines between the disks and the crankcase partitions to prevent axial displacement of the disks. In Figs. 9 and 11, the upper portions of the center and rear disks 138 have been displaced from their normal position in order to more clearly show this construction. The two halves of each disk are bolted together with the keys 139 and key 143 therebetween by bolts 212. Thus, each crankcase partition 162 with its associated liner 137, plates 210, keys 139, disk 138, bearing 208 and key 143 constitute after assembly a rigid wall which retains and supports the crank shaft on the journals 182, 184, 186 (Fig. 20). The front and rear journals 180, 188 are mounted in bearings supported by the integral partition walls 163.

The three crankshaft bearing support disks 138 are made of magnesium alloy having a higher coefficient of thermal expansion than the aluminum alloy of the crankcase. They are machined to an outer diameter providing a sliding fit between the disks and the liners 137 at room temperature, but because they have a higher coefficient of expansion than the crankcase they expand more than do the bores 136 as the engine temperature rises a hundred or more degrees to the operating temperature range, thus providing the equivalent of a shrink fit between the disks 138 and partitions and liners 162, 137 during engine operation, when the stresses are greatest. Yet at room temperature the parts may be readily assembled by assembling the main bearing halves, disk halves, and keys around the corresponding crankshaft journal and then sliding the crankcase section, with its liner 137, over the disk, after which plates 210 are bolted in place to lock the disk assembly to the partition 162.

A cam drive shaft 166 and its associated gears 164, 168 is rotatably mounted in each half of each disk 138. The disks are angularly positioned relative to the crankcase by the projections on keys 139 which fit within slots 141 in the plates 210 and thus the cam drive gears are also located in a predetermined manner relative to the cam rings 150 and the intermediate cam drive gears 170 on the crankshaft.

Crankshaft 58 (Figs. 20 to 25 and 30 to 36) is a one-piece machined steel forging which is carefully balanced. It has four crankpins 172, 174, 176, 178, and five main journals 180, 182, 184, 186, 188, located at the ends and between the crankpins. The center journal has flanged ends 190, 192, which locate the shaft axially and transmit thrust through the center bearing and its disk support 138 and partition 162 to the crankcase.

Adjacent crankpins are angularly displaced by 180° plus the angle of the cylinder spacing so that the crankpins are aligned with the helical cylinder banks. Corresponding cylinders in adjacent rows are spaced by 12⁶/₇°, hence the crankpins are correspondingly spaced (Figs. 30–36) with the exception that adjacent throws or crankpins are reversed in direction. Starting with rear (A) crankpin and looking toward the front, the intermediate rear (B) crankpin is angularly spaced 192⁶/₇° in a clockwise direction from the A row crankpin. Likewise the center of each succeeding crankpin immediately behind it. As the crankpins are alternately positioned up and down and in addition are progressively offset by 12⁶/₇° the front (D) crankpin center is, therefore, 218⁴/₇°, clockwise rotation from the rear (A) crankpin center. Four counterweights are used in the modification of Figs. 20–25 and 35, 36; two of them, 199, 201 being located directly opposite the front and rear crankpins in the plane of the corresponding crankthrow. The other two counterweights 198, 200, are also located opposite the front and rear crankpins, respectively but are angularly offset from the plane of the corresponding crankthrow by an angle of 2° 22'. In the modification of Figs. 32 and 34 only the two end counterweights are used, in this instance angularly displaced by 2° 42' from the plane of the corresponding throw. The extreme front and rear counterweights may be suspended on bearings 193 by pins 203, 205 to form torsional vibration dampers. The cam drive gears 170 are supported on flanges adjacent each main bearing. The front of the crankshaft is provided with splines 202 for driving sun gear 56. The rear of the crankshaft is provided with a quill 173 attached in the rear journal of the crankshaft and which has external splines 204 thereon for driving a hydraulic damper 206 (Figs. 11 and 12). Quill 173 also provides a support and drive for the rear cam drive gear 171.

Figure 14:
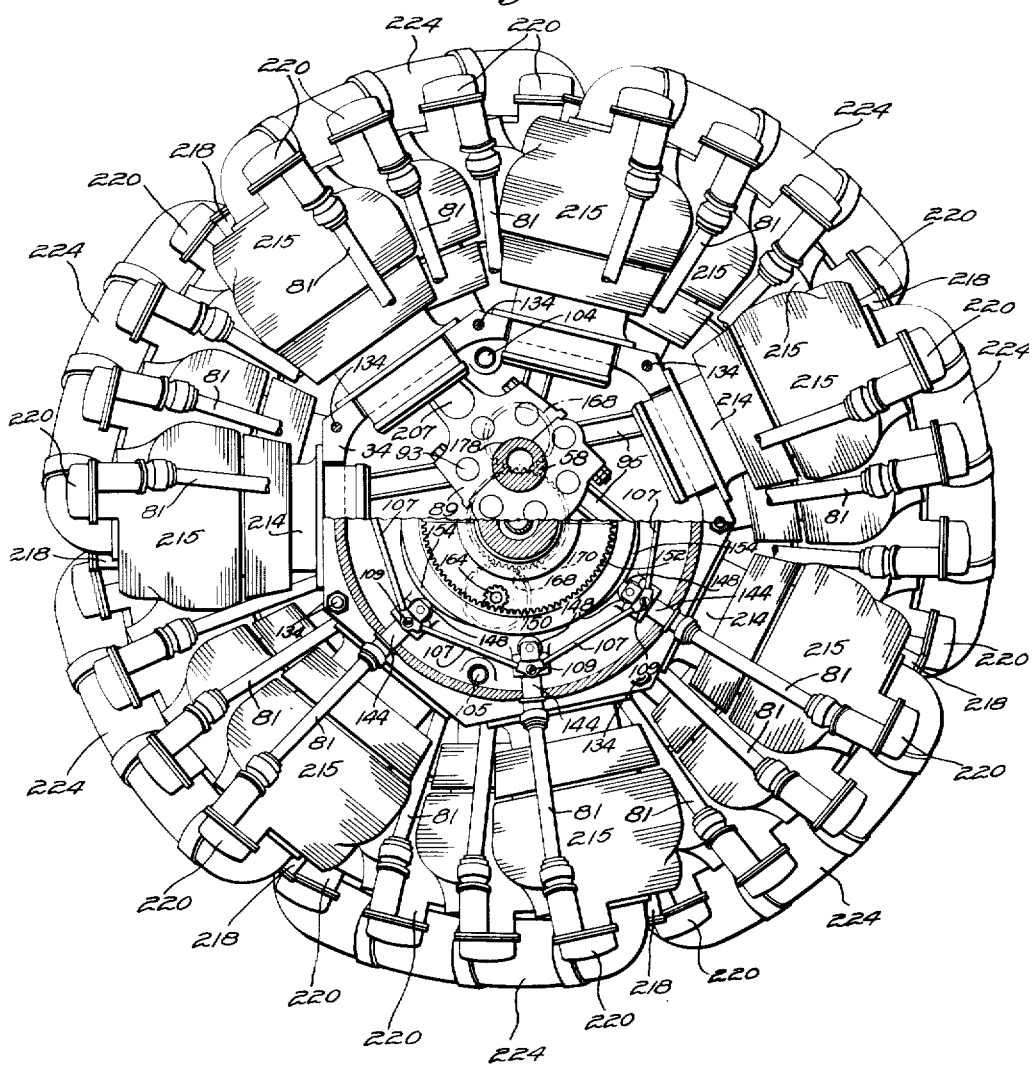
Fig. 14 is a transverse sectional view taken immediately in front of the front cylinder row looking toward the rear, broken away to show at the top center the articulated connecting rod system and at the bottom center the front cam ring, cam ring drive and oil feed to the push rods.

The crankpins are connected to forged aluminum alloy pistons 87 in corresponding cylinder rows by an articulated connecting rod system including master rods 207, 209, 211 and 213 positioned in predetermined cylinders as shown in Figs. 30, 31 and having big ends 89 (Fig. 14) journalled on the crankpins and on which link rods 95 are pivoted at 93.

Each of the twenty-eight cylinder assemblies, which are identical, comprise an alloy steel barrel 214, an aluminum alloy cooling muff 216 shrunk on the barrel, and an aluminum alloy head 85 having a flat top 75 and opposed rocker boxes 218, 220 projecting laterally therefrom in the general direction of the cooling airflow. The head and muff abut and are machined to form cooling fins extending continuously from the bottom of the muff to the flat top 75 of the head 85. Each fin lies in a plane normal to the cylinder axis and parallel to the direction of cooling airflow and the intake rocker boxes 220 are positioned symmetrically opposite the exhaust rocker boxes 218 so that each cylinder may be operatively mounted in either of two directly opposed positions on the same crankcase. Thus the intake and exhaust rocker boxes may be interchanged by rotating each cylinder through 180°, enabling either a pusher or a tractor type engine to be assembled from the same cylinder and crankcase parts, except for the cam rings 150 which are different for the two engine types. Because of the slightly offset position of the intake ports 222, with respect to the center of the head, a slight change is also necessary in the position of the intake manifold outlets when the cylinders are reversed.

Each pair of rocker boxes 218, 220 projects upwardly or generally radially of the engine at an angle to the cylinder axis for a short distance and laterally or generally longitudinally of the engine for a considerable distance beyond the sides of the cylinder; and they are exactly diametrically opposed so that a straight line drawn through the rocker box centers intersects the cylinder axis. The cylinders are so mounted on the crankcase (Figs. 1, 2, 14) that each such line forms an angle of 14° with the crankshaft axis and extends transversely to the line of the corresponding cylinder bank. This combination of cylinder banks extending helically with respect to the crankshaft axis and opposed rocker boxes positioned on lines extending at an angle to the crankshaft axis and transversely to the cylinder banks enables the fore and aft rocker boxes of corresponding cylinders in adjacent rows to be longitudinally overlapped as shown in Fig. 1, thus enabling the power section and the crankshaft to be made of minimum length, which is of vital importance in a four row engine having a plurality of pistons exerting a very large torque on each crankthrow. Furthermore, it enables a single cam ring, located between adjacent cylinder rows, to operate valves in said adjacent rows, by means of the tappets in the guide holes 147, 149 in Fig. 2. The rocker boxes of each cylinder row extend laterally, into the intercylinder spaces of adjacent rows, rather than radially, thereby effecting a material reduction in engine diameter. Yet, the length of the engine is maintained at a minimum because the rocker boxes are longitudinally overlapped and circumferentially interpositioned, and the push rods are inclined outwardly from the tappets adjacent the cylinder bases to the outer end of the rocker arms and rocker boxes. Further, the rocker boxes and push rods are approximately aligned with the cooling airflow, thus minimizing cooling drag.

Figure 18:
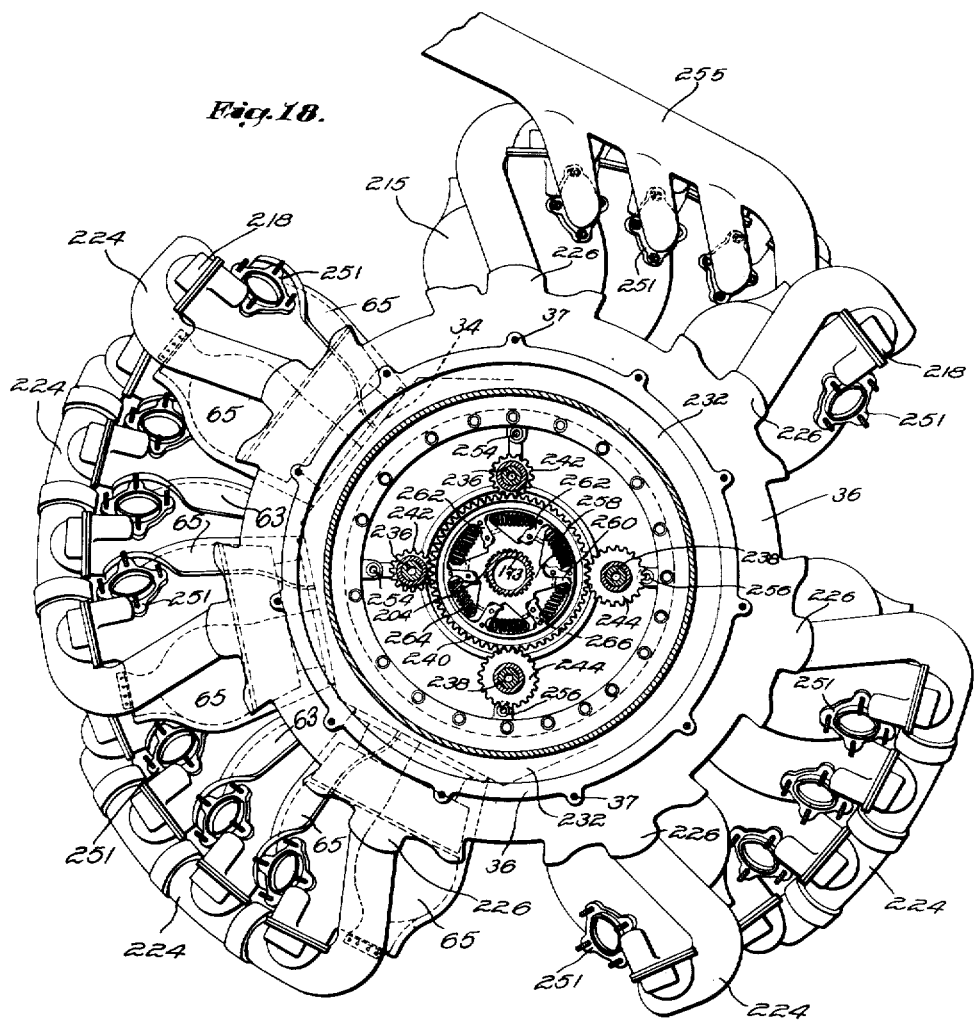
Fig. 18 is a view along the line 18—18 in Fig. 12, showing on different cylinder banks the exhaust manifold and the cooling air baffles. Some of the cylinder banks are omitted in this view.

As each pair of rocker boxes extend transversely to the line of the corresponding cylinder bank and are disposed on opposite sides of the cylinder, a gap or channel is provided along the top of each cylinder bank in which are disposed the intake manifolds 224 extending from the supercharger outlets 226 directly along the top of each bank, between the fore and aft rocker boxes, to the intake port 222 of the front cylinder in the bank. Thus the diameter of the engine is maintained at a minimum. The manifolds are also connected to the intake ports 222 of the three rear cylinders of its bank, by short branch outlets, providing a single pipe or gallery manifold of minimum airflow resistance for feeding all the cylinders of each bank from the outlets 226 on the blower collector ring 232, which outlets are equally spaced around the periphery of the blower casing 36 (Figs. 18, 28). As the intake ports 222 are in the top of the cylinder heads, the intake manifolds may be similarly positioned between the rocker boxes and connected with little or no change to the cylinders of the banks in either the tractor or the pusher arrangement mentioned above. While the intake manifolds extend along the tops of the banks between the rocker boxes in both the tractor and pusher modifications, the blower in one case is downstream of the cylinders and in the other case upstream of the cylinders. A tractor engine has exhaust ports directed toward the blower end of the engine, whereas a pusher engine has exhaust ports directed toward the propeller end of the engine; hence the exhaust ports are on the downstream side of the cylinders in both engine types. To facilitate assembly, each intake manifold may be made in sections, with flexible joints 241 (Fig. 27).

Blower case 36 is a magnesium casting attached to the rear of the crankcase and which houses the impeller 228 and a vaned diffuser 230. Collector ring 232 around the periphery of the blower case receives the fuel and air mixture from the diffuser and distributes it uniformly among the seven equally spaced blower outlet ports 226, from which it is uniformly distributed among the cylinders of each bank by the intake manifolds 224, which extend generally radially from the blower outlet ports in back of each bank to the top of the rear cylinders in the bank (Fig. 18) and then curve over the tops of the cylinders and extend in a substantially straight line between the rocker boxes, as shown in Figs. 1, 27, 28.

The drive for the impeller 228 is contained in the front portion of the blower case 36 and comprises two high speed fluid couplings (one of which is shown at 247) and two low speed fluid couplings (one of which is shown at 234). These couplings are mounted on shafts 236, 238 supported by walls of the blower case and which are hollow to admit working fluid, preferably engine oil, to the couplings for the purpose of controlling the slip thereof to vary the speed of the impeller relative to the engine. The driving sides 331, 335 of the couplings are driven by the crankshaft through a spring drive and hydraulic damper unit 206, which has a gear 240 around its periphery meshing with pinions 242 and 244. The driven sides 333, 337 of the couplings are connected to drive gear 326 of the impeller shaft 312 by gears 248 and 250. Low speed coupling 234 contains a ring cut off valve 252 which acts in conjnction with a control valve 300 (Fig. 2) in the manner disclosed and claimed in the Hobbs-Willgoos application Serial No. 492,423 (Patent No. 2,400,307), to shift the drive between the low speed and the high speed coupling as the speed of the impeller is varied throughout its range of speeds relative to the engine. The control valve, which regulates the flow of working fluid to the couplings may have its two ports respectively connected by conduits with the inlet ports 254, 256 for hollow shafts 236, 238 as shown in Fig. 12. As disclosed in the said application Serial No. 492,423, the working fluid is constantly drained from the couplings in a relatively small amount through restricted openings, and the slip of the couplings is controlled by varying the inlet flow to vary their filling, or liquid content. In the embodiment shown, only one supercharger stage is provided, driven at a controllable gradually variable speed ratio relative to engine speed by means of the fluid couplings 247, 234. Where an auxiliary supercharger stage is provided, impeller 228 may be driven through a conventional gear reduction drive at a fixed speed ratio relative to engine speed.

Spring drive and hydraulic damper unit 206 comprises a spider member 258 splined to the quill 173 having outwardly projecting radial vanes 260 which are interposed between the inwardly projecting radial vanes 262 fixed to the gear 240. The drive is transmitted from the spider vanes through coil springs 264 to the gear vanes 262. The space between the vanes is maintained full of the viscous fluid such as engine oil and certain of the vanes have restricted openings 266 therethrough, thereby hydraulically damping torsional vibrations which cause the vanes to move toward and away from each other. Thus, torsional vibrations of the crankshaft are damped and are isolated from the fluid couplings 247, 234 and impeller 228.

Accessory drive housing 38 is a magnesium alloy casting having a flange 268 on its upper side to provide a mounting surface for a down draft carburetor 270, of a conventional pressure injection type. Air passing through the carburetor is admitted to the rotating inducer 274 and impeller 228 by intake passage 272. A fuel feed valve 276 contained in a web or boss 278 discharges fuel, as metered and proportioned to airflow by the carburetor, into the spinner cup 280 which is carried by and rotates with the impeller 228. The fuel is maintained in an annular bed within the cup by centrifugal force and is discharged from this bed into the airstream passing through the impeller by passages or discharge nozzles 282. Discharge nozzle 276 acts in a known manner to shut off the flow of fuel except when the fuel pressure is above a predetermined minimum.

The outer wall of the accessory drive housing is provided with mounting pads, 284, 286, 288, 290, 292, (Figs. 12 and 19), which serve as supports for the accessories and their drives. The accessory drive shafts 328, 342, 346, 348, 350, 354, are positioned radially and are driven by a single bevel accessory drive gear 294. Two additional mounting pads, one of which is shown at 296, are provided for the main oil sump 298. An oil pressure chamber 304 containing two concentric cylindrical oil screens 306 is located in the bottom central portion of the accessory drive housing.

As accessory drive shaft 308, which is splined within the quill 173 at 310, extends through the blower and accessory sections, passing through the hollow impeller shaft 312. The rear end of shaft 308 is splined at 313 to the hub 314 of the accessory drive gear 294, and is supported at the enlarged portion 316 by a steel backed bronze bearing 318 mounted in a cylindrical boss 320 in the accessory drive housing. The rear end of the accessory drive shaft is supported by a bearing 319.

Impeller shaft 312 is supported internally on two steel backed bronze bearings 322, 324 by the accessory drive shaft. Impeller 228 is splined and shrunk onto the impeller shaft 312 at 311, making a semi-permanent assembly. Spur pinion 326 is also splined on to the front end of the impeller shaft, at 309.

Two tachometer drives 328, 330, 332 and 334, are provided, one on the left and one on the right side of the accessory drive housing. These drives are supported by the walls of the housing and incorporate integral spiral gears (not shown) which are driven by the spiral gears 332 on the shafts 330. A supercharger or pump 336 for the ignition system may be mounted on the pad 338 and driven by shaft 330 while a fuel pump (not shown) may be mounted on the pad 340 and driven by the corresponding shaft 330.

The radial accessory shafts (Fig. 19) are mounted in bushings 352, 354, 356, 358, 360, which are interchangeable among the various accessory mounting pads. Thus the accessories may be interchanged so that they may be supported and driven in any one of a large number of various positions and arrangements around the accessory drive housing. For an example of one such arrangement, a generator may be mounted on the pad 286, a vacuum and hydraulic pump may be mounted on the pad 290, a second generator may be mounted on the pad 284, a pressure oil pump 362 and scavenge pump 363 may be mounted on the pad 292 and a starter may be mounted on the pad 288.

By arranging the accessories circumferentially around the periphery of the accessory drive housing the rear face of the housing is left free and is utilized to support an auxiliary drive for an engine cooling fan or an auxiliary supercharger stage. As shown in Fig. 12, the auxiliary drive housing 39 contains a fluid drive for an engine cooling fan 364 having turbine type blades 365 between the ring shrouds 367, 368, and provides a fixed ratio drive for the power take off shafts 336, 367, which are splined together at 365. The three fluid couplings of the fan drive are mounted on shafts 368, 370, 378, (Fig. 19), two of which are shown in the plane of the view of Fig. 12. Mounted on the shaft 368 is a low speed fluid coupling 372 and mounted on the shaft 370 is a high speed coupling 374 which are driven and controlled in the manner explained in the Hobbs-Willgoos application Serial No. 492,423. The low speed fluid coupling is provided with a cut off ring valve 274. Both couplings are fed through passages within the corresponding shafts and oil may be admitted to the shafts by conduits, one of which is shown at 376. The inlet to shaft 370 has been omitted from the drawing in the interest of clarity.

The couplings are driven from the accessory shaft 308 by a cage 378 splined to the shaft 308 at 313 and having a gear 380 thereon meshing with pinions 382 and 384 respectively connected to the driving members 386 and 388 of the low and high speed couplings. Driven members 390 and 392 of the couplings are fixed to pinions 397, 396, which mesh respectively with gears 398, 400 on the fan driving shaft 401.

Cage 378 also supports a plurality of shafts 404 on which are rotatably mounted pinions 406 meshing with a fixed gear 408 secured to the accessory casing and with a sun gear 410 on the power take off shaft 336. The fan shaft 401 and the power take off shaft 336 rotate relative to each other on bearings 411, 413, 415. They are supported on the case 39 by a ball bearing 414. With this arrangement, accessory shaft 308 drives the cage 378 and the coupling drive gear 380 at accessory shaft speed. It also carries the pinions 406 around the fixed gear 408 and thus causes the sun gear 410 to be driven at a predetermined different speed relative to the speed of the accessory shaft 308, dependent upon the ratio of the planetary gear. Fan speed may be gradually varied relative to the speed of the engine by varying the filling of the coupling 372 or the coupling 374, dependent upon which is driving. The power take off shaft 336, which is driven at a predetermined fixed speed ratio relative to the engine, may be utilized for driving an auxiliary supercharger stage, a second propeller, a second fan, or for similar purposes.

The rear section arrangement shown readily lends itself to the formation of different engine types with a minimum number of parts. Thus, fan 364 may be omitted and the fluid couplings 372, 374 utilized to drive an auxiliary blower stage. This can be readily done simply by omitting the power take off shaft 336, 367 and directly connecting the coupling drive gear 380 to the sun gear 410, instead of to the cage 378, thus providing by a very simple change in the gearing a speed increasing gear train suitable for a blower drive. When such a change is made the auxiliary supercharger impeller is connected to the drive shaft 401 and the casing 39 is replaced by a similar casing which supports the auxiliary supercharger. When an auxiliary supercharger stage is provided, the main stage 36 can be driven either through the fluid couplings 247, 234 at a gradually variable speed, thus providing two stages each having gradually variable speed ratios; or it can be driven by a speed increasing gear drive of fixed ratio, thus providing two stages, one of fixed ratio and the other of variable ratio.

Figure 19:
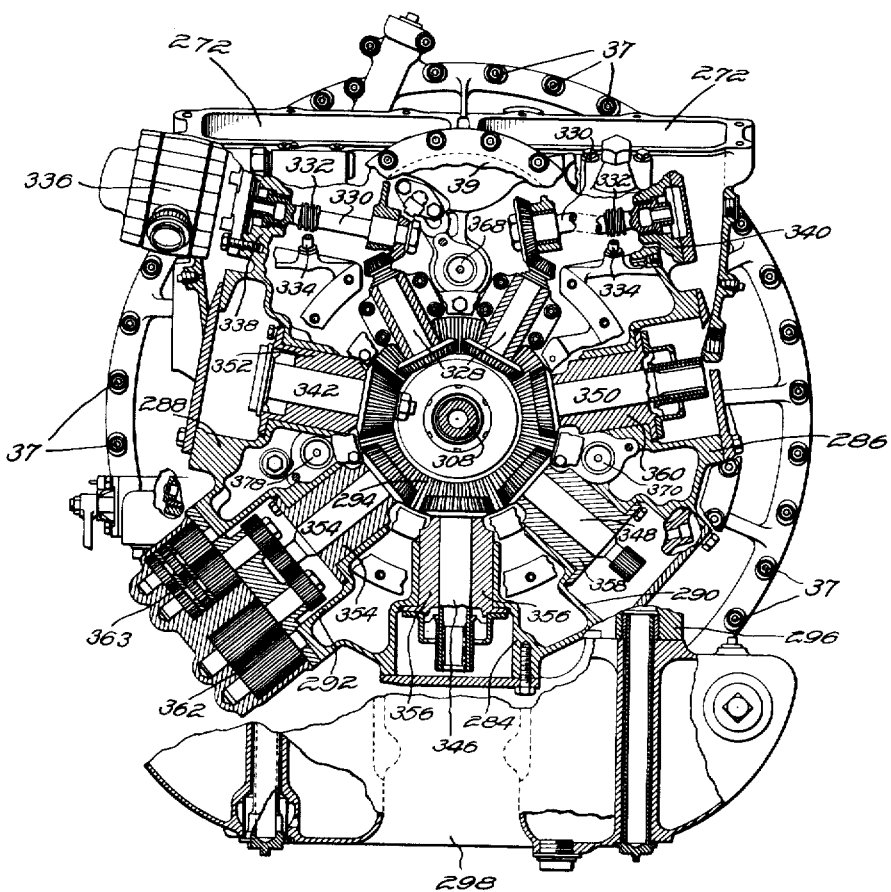
Fig. 19 is a transverse section looking toward the front, taken through the accessory section immediately to the rear of the accessory main drive gear. Certain parts have been broken away or slightly displaced from their actual position in order to simplify the drawing.

Most of the lubrication details have been omitted in order to simplify the drawing. In general, oil is supplied from a tank (not shown), having its inlet and outlet connected to the pads 301, 303 (Fig. 2), to the main pump 362 (Fig. 19). From there the pressure oil is pumped through the strainers 306 to the interior of the crankshaft and, by a separate passage (not shown) to the top crankcase pressure line 104. The pressure oil is fed to the interior of the push rods, and through them to the rocker boxes, by ring manifolds 107, connected to line 104 and to each tappet. Torquemeter booster pump 82, which is driven by gear 169 off the top front cam drive gear 168 (Figs. 15, 16) is also connected to and supplied from line 104.

Drain oil from the rocker boxes of the top cylinders is returned to the crankcase through the push rod cover tubes 175, and the other rocker boxes are drained down the line of each bank by pipes 271 and between banks by pipes 273 to the front oil sump 281 and the rear oil sump 279 (Fig. 26). The front sump is scavenged by pump 46 (Fig. 3) which also scavenges the nose and magneto sections 30, 32 and discharges into the main scavenge oil line 103.

Figure 15:
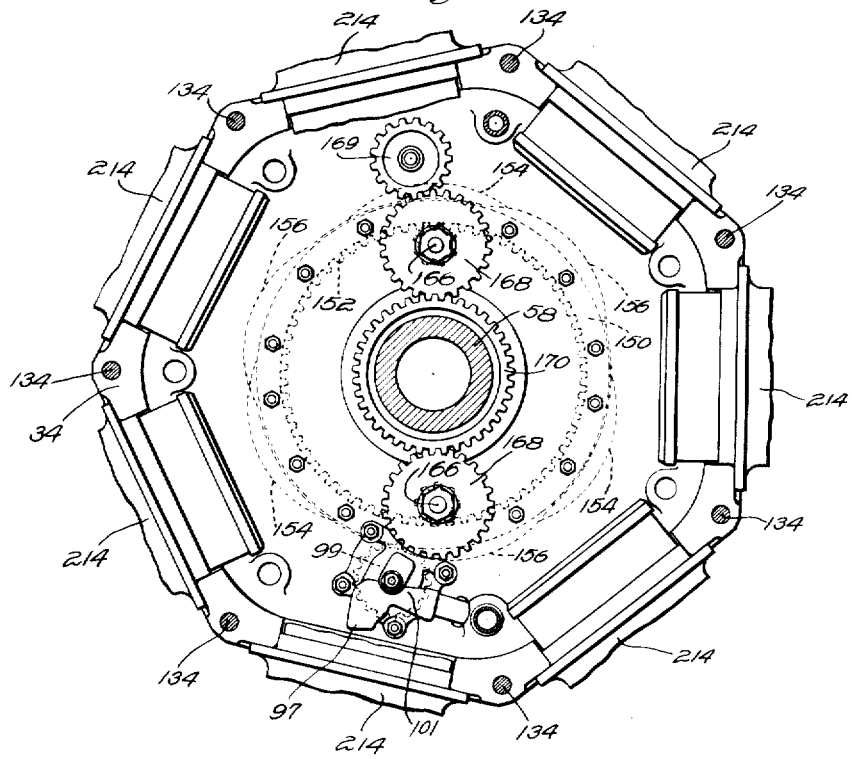
Fig. 15 is a view along the line 15—15 in Fig. 9, showing the cam drive gears, torquemeter gear drive, scavenge pump drive, and scavenge pump inlet connection.
Figure 16:
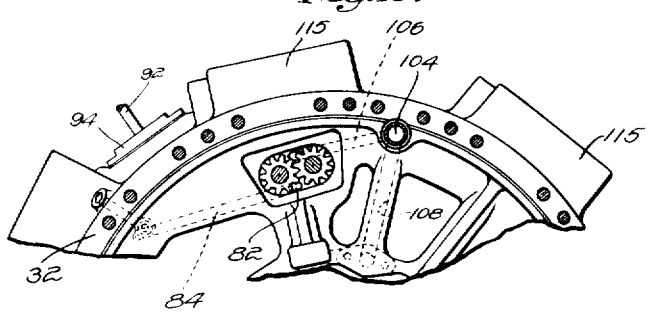
Fig. 16 is a transverse section taken immediately in front of the front crankcase partition, looking toward the front, showing the torquemeter booster pump.
Figure 17:
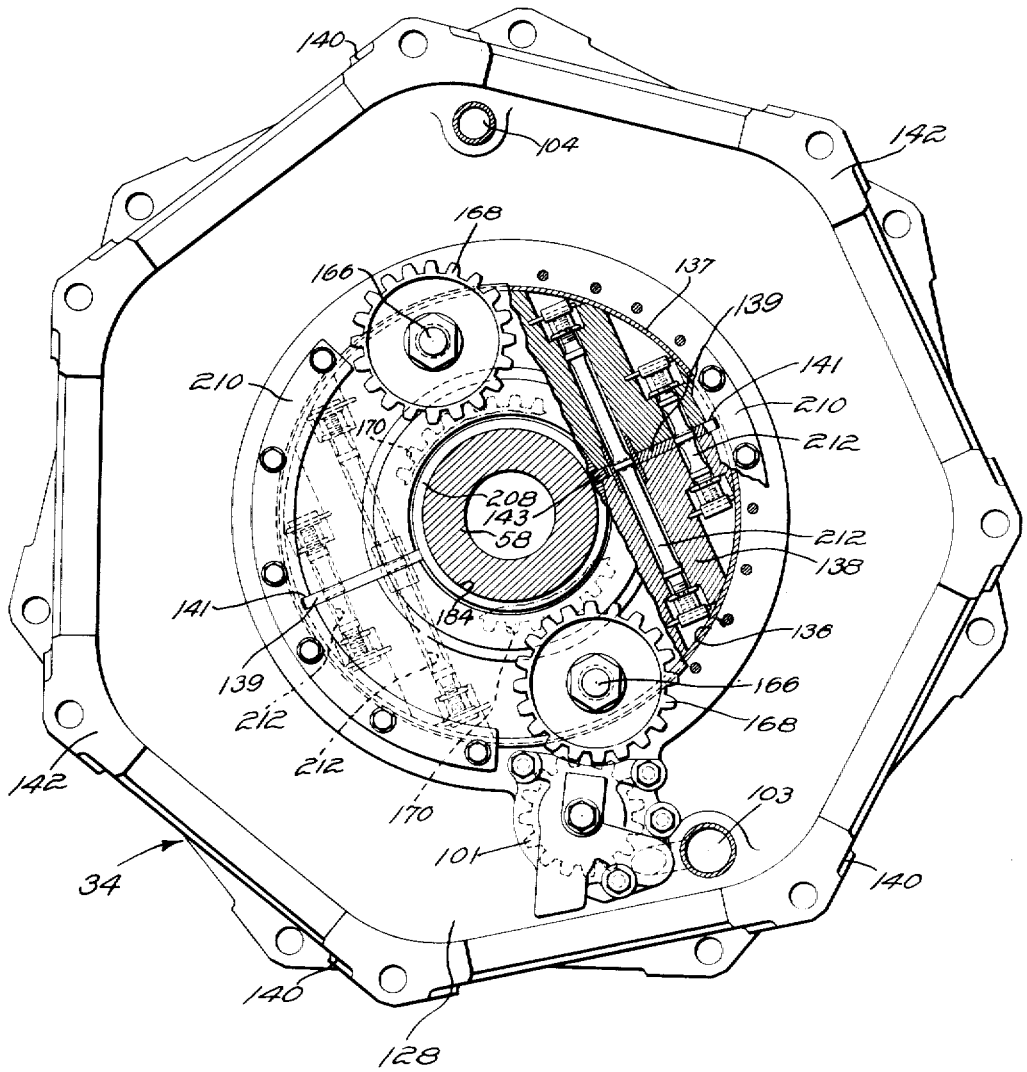
Fig. 17 is a transverse view, partially broken away, taken immediately in back of the center crankcase partition, looking toward the front, showing the crankshaft supporting means and cam and scavenge pump drives.

Each crankcase section is scavenged by a separate pump, of the internal-external gear type, which is driven off the lower cam drive gear 168 by a gear 99 (Figs. 15, 17). These pumps each pick up crankcase drain oil through inlets 97 and discharge into the main scavenge oil line 103, which has its outlet end connected with the oil tank.

The rear rocker box sump 279 and the rear section sump 298 are each scavenged by the pump 363 (Fig. 19) which also discharges into the main oil reservoir attached to the pads 301, 303.

Figure 13:
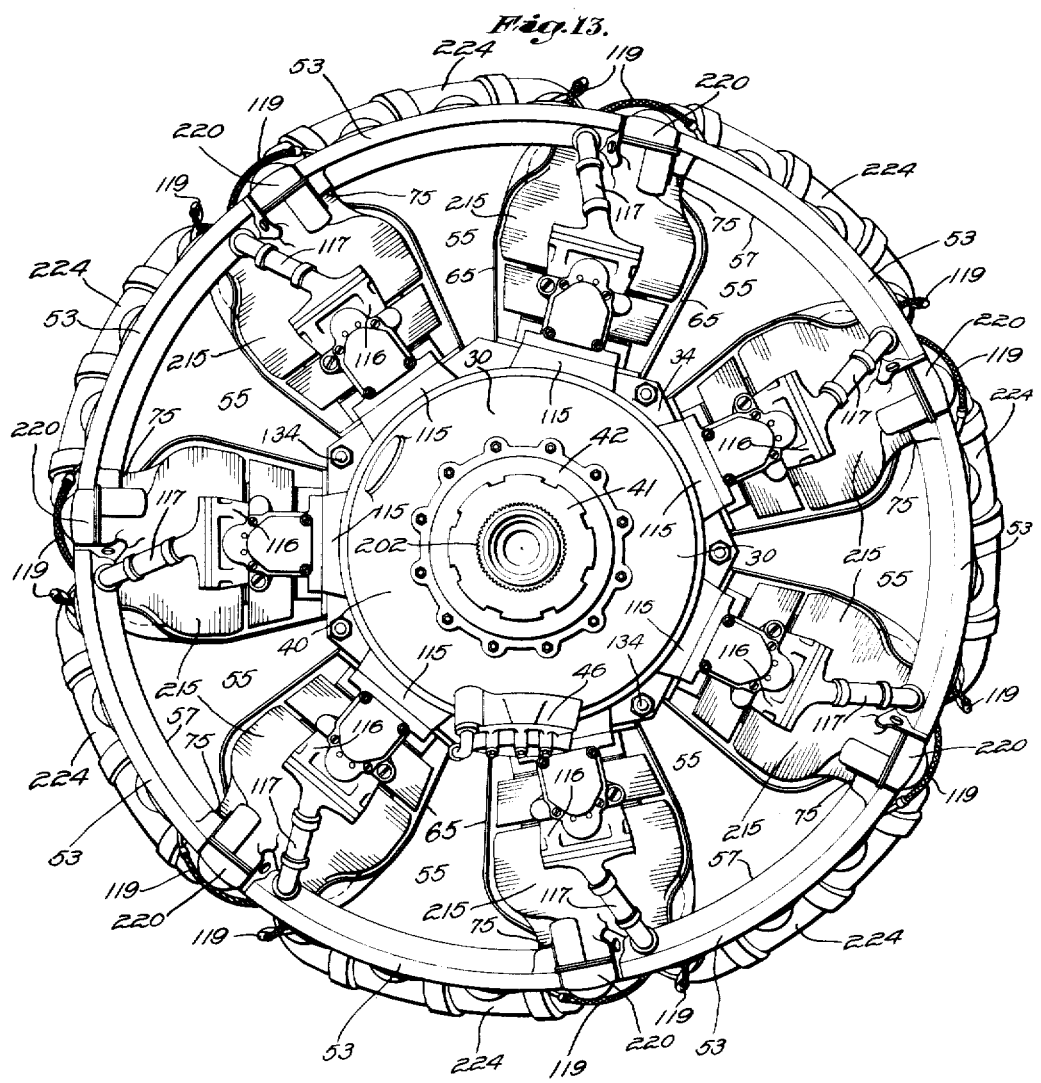
Fig. 13 is a front view including the inner cowling and manifolds and omitting the three rear cylinder rows.

Uniform and efficient engine cooling, with minimum resistance to the flow of cooling air, is provided by the novel combination of cylinders, baffles, and other parts as best shown in Figs. 1, 13 and 18. An inner cowl 57 extends continuously around the front of the crankcase at the diameter of the flat tops 75 of the cylinders 215. This cowl is composed of gores or segments 53 extending longitudinally and of varying width so that they completely bridge the interbank gaps circumferentially at the front of the engine but only partially bridge the gaps between the cylinder banks at the rear of the engine. Radial bulkheads 59 connect one longitudinal edge of each inner cowl segment 53 with the outer surface of the crankcase, and the other edges of the inner cowl segments rest on the flat tops 75 of the cylinders, thereby forming tunnels or air ducts 55 for feeding cooling air to the cylinders in the corresponding cylinder bank. Bulkheads 59 extend from one side of the front cylinder in one bank to the opposite side of the rear cylinder in an adjacent cylinder bank, thereby providing a tapering duct 55 having its top closed by the cowl portions 53 on the upstream side of each cylinder bank and a tapering channel 63 having an open top on the downstream side of each cylinder bank. Intercylinder baffles 65 confine the air passing from the inlet tunnels 55 to the exhaust channels 63 to the interfin spaces, as disclosed and claimed in the Hobbs application Serial No. 444,062. If desired the inner cowl 57 can be made circumferentially continuous over the entire length of the cylinder banks, thereby providing enclosed exhaust cooling air passages as well as enclosed intake cooling air passages. An outer cowl (not shown) is provided and has its forward end attached to the front annular edge of the inner cowl 57, so that the airstream is smoothly divided into an outer free airstream flowing over the outer cowl and an inner cooling airstream flowing through the inner cowl.

If the cylinders are reversed from the tractor engine position shown in Fig. 1 to form a pusher engine, the cowling and baffles 53, 59, 65 are also reversed, so that the inlets to ducts 55 open to the blower end of the engine, rather than the propeller end.

As shown in Figs. 1, 27 and 28 each bank of cylinders has its own charging and ignition means. The inlet ports of each bank are all fed from a single manifold and all the spark plugs of each bank (there are two spark plug holes 89 to each cylinder) are supplied with ignition current through manifolds 117 and leads 119, 121, 125, 127 from separate magnetos 116. The valve mechanism is associated with the cylinder rows rather than the banks, as each cam ring extends circumferentially around the crankshaft axis and each cylinder row has its own pair of cam tracks 154, 156 operatively associated therewith.

Thus the valve mechanism and crankcase parts are of the radial engine type, simple and lightweight in construction and reliable in operation, but the charging and firing mechanism is more similar to the inline engine type. The combination provides the advantages of the radial type engine, yet each bank functions to a large extent as a separate engine, which considerably increases engine dependability, particularly when used with the firing order disclosed in Figs. 20 and 31. The ignition and valve mechanism are so timed relative to crankshaft and piston position to provide the firing sequence shown in these figures, by which both the cylinders of the engine as a whole and the cylinders of any one bank are fired at equal intervals. In addition, the cylinders of each bank are fired consecutively down the bank. With this arrangement the torque impulses are uniformly spaced (twentyeight to each two crankshaft revolutions because the engine is of the four cycle type), the charging characteristics of the engine are exceptionally good, and one or more cylinder banks may completely cut out (for instance in the event of a magneto failure) with minimum effect upon the smoothness of engine operation.

Reference is made to the following applications which claim subject matter disclosed but not claimed in this application: Serial No. 552,368, Serial No. 552,369, Serial No. 552,370, filed concurrently herewith; Willgoos applications Serial No. 563,880, filed November 17, 1944, and Serial No. 589,585, filed April 21, 1945; and Willgoos-Highberg application Serial No. 559,636, filed October 20, 1944; and Newcomb application Serial No. 551,995, filed August 30, 1944.

The word "longitudinal" is used in a broad sense in this application to include cylinder banks extending generally lengthwise.

It is to be understood that the invention is not limited to the specific embodiment herein illustrated and described. For instance, it may be used in engines having five or nine longitudinal banks, or more than four circumferential rows, or in other ways without departure from its spirit as defined by the following claims.

We claim:

1. In a four row radial aircooled aircraft engine having a crankshaft, a plurality of circumferentially spaced cylinder banks extending spirally with respect to said crankshaft, a cam ring whose plane extends trasversely with respect to said crankshaft between each pair of adjacent cylinders in said banks, valve rocker boxes on each of said cylinders extending in a generally fore and aft direction into the interbank spaces and overhanging said cam rings, and means for connecting rocker arms in said rocker boxes with said cam rings.

2. In a radial aircooled aircraft engine, a plurality of cylinders arranged in at least four circumferential row and in spiral banks, the cylinders of each bank having opposed valve rocker boxes thereon extending outwardly therefrom respectively on opposite sides of the line of said bank, and a manifold for each bank extending in the direction of said bank over the tops of said cylinders between said rocker boxes.

3. In an aircraft engine, a crankcase, a spiral bank of cylinders on said crankcase, each of said cylinders having opposed longitudinally extending rocker boxes thereon with adjacent rocker boxes overlapping each other in a longitudinal direction, and a cam ring between each pair of adjacent cylinders operatively connected to the respective pair of adjacent overlapped rocker boxes.

4. In an aircraft engine, a plurality of cylinders arranged in four or more circumferential rows and five or more longitudinal banks, said cylinders having opposed valve rocker boxes thereon, cam rings on opposite sides of each of said cylinder rows operatively connected with said rocker boxes, and separate ignition distributing systems and intake pipes for each of said cylinder banks.

5. A radial aircooled aircraft engine comprising, a crankcase having four circumferential rows and spiral banks of cylinders mounted thereon, a magneto section attached to one end of said crankcase and having ignition distributing devices mounted thereon in alignment with respective cylinder banks, a blower section attached to the other end of said crankcase and having outlets respectively aligned with said cylinder banks, separate ignition manifolds for each of said banks connected to respective ignition devices, separate intake manifolds for each of said banks connected to respective blower outlets, and cam rings on opposite sides of each cylinder row for operating intake and exhaust valves in said cylinders.

6. In a radial aircooled aircraft engine a, plurality of cylinders arranged in circumferential rows and spiral banks, a pair of diametrically opposed fore and aft valve rocker boxes on each of said cylinders, the adjacent rocker boxes of adjacent cylinder rows being longitudinally overlapped and a valve cam ring having a pair of cam tracks thereon between each pair of adjacent cylinder rows and operatively associated with rocker boxes on each of said adjacent cylinder rows.

7. An engine according to claim 3, having an intake pipe positioned between the rocker boxes.

LEONARD S. HOBBS.
ANDREW V. D. WILLGOOS.

REFERENCES CITED

The following references are of record in the file of this patent:

UNITED STATES PATENTS

| Number | Name | Date |
|---|---|---|
| 1,367,194 | Lefranc | Feb. 1, 1921 |
| 2,366,852 | Goodman | Jan. 9, 1945 |
| 1,860,814 | Nutt et al. | May 31, 1932 |
| 1,904,680 | Ferry | Apr. 8, 1933 |
| 2,350,377 | Tjaarda | June 6, 1944 |
| 1,293,712 | Church | Feb. 11, 1919 |
| 2,154,359 | Sarazin | Apr. 11, 1939 |
| 1,237,311 | Donning | Aug. 21, 1917 |
| 1,355,451 | Carpenter | Oct. 12, 1920 |

FOREIGN PATENTS

| Number | Country | Date |
|---|---|---|
| 497,592 | England | 1938 |
| 306,942 | England | 1930 |
| 120,285 | England | 1918 |
| 232,399 | England | 1925 |
| 342,309 | France | Sept. 5, 1904 |

Certificate of Correction

Patent No. 2,426,879.                                       September 2, 1947.

LEONARD S. HOBBS ET AL.

It is hereby certified that errors appear in the printed specification of the above numbered patent requiring correction as follows: Column 14, line 15, claim 1, for "trasversely" read *transversely*; line 25, claim 2, for "row" read *rows*; line 31, same claim, after "cylinders" insert *through gaps*; line 33, claim 3, for "cyllinders" read *cylinders*; and that the said Letters Patent should be read with these corrections therein that the same may conform to the record of the case in the Patent Office.

Signed and sealed this 4th day of November, A. D. 1947.

[SEAL]

THOMAS F. MURPHY,
*Assistant Commissioner of Patents.* with rocker boxes on each of said adjacent cylinder rows.

7. An engine according to claim 3, having an intake pipe positioned between the rocker boxes.

LEONARD S. HOBBS.
ANDREW V. D. WILLGOOS.

REFERENCES CITED

The following references are of record in the file of this patent:

UNITED STATES PATENTS

| Number | Name | Date |
|---|---|---|
| 1,367,194 | Lefranc | Feb. 1, 1921 |
| 2,366,852 | Goodman | Jan. 9, 1945 |
| 1,860,814 | Nutt et al. | May 31, 1932 |
| 1,904,680 | Ferry | Apr. 8, 1933 |
| 2,350,377 | Tjaarda | June 6, 1944 |
| 1,293,712 | Church | Feb. 11, 1919 |
| 2,154,359 | Sarazin | Apr. 11, 1939 |
| 1,237,311 | Donning | Aug. 21, 1917 |
| 1,355,451 | Carpenter | Oct. 12, 1920 |

FOREIGN PATENTS

| Number | Country | Date |
|---|---|---|
| 497,592 | England | 1938 |
| 306,942 | England | 1930 |
| 120,285 | England | 1918 |
| 232,399 | England | 1925 |
| 342,309 | France | Sept. 5, 1904 |

Certificate of Correction

Patent No. 2,426,879.

September 2, 1947.

LEONARD S. HOBBS ET AL.

It is hereby certified that errors appear in the printed specification of the above numbered patent requiring correction as follows: Column 14, line 15, claim 1, for "trasversely" read *transversely*; line 25, claim 2, for "row" read *rows*; line 31, same claim, after "cylinders" insert *through gaps*; line 33, claim 3, for "cyllinders" read *cylinders*; and that the said Letters Patent should be read with these corrections therein that the same may conform to the record of the case in the Patent Office.

Signed and sealed this 4th day of November, A. D. 1947.

[SEAL]

THOMAS F. MURPHY,
*Assistant Commissioner of Patents.*